J. MOSCA.
TRACTOR.
APPLICATION FILED SEPT. 22, 1916.
1,230,014.
Patented June 12, 1917.
2 SHEETS—SHEET 1.
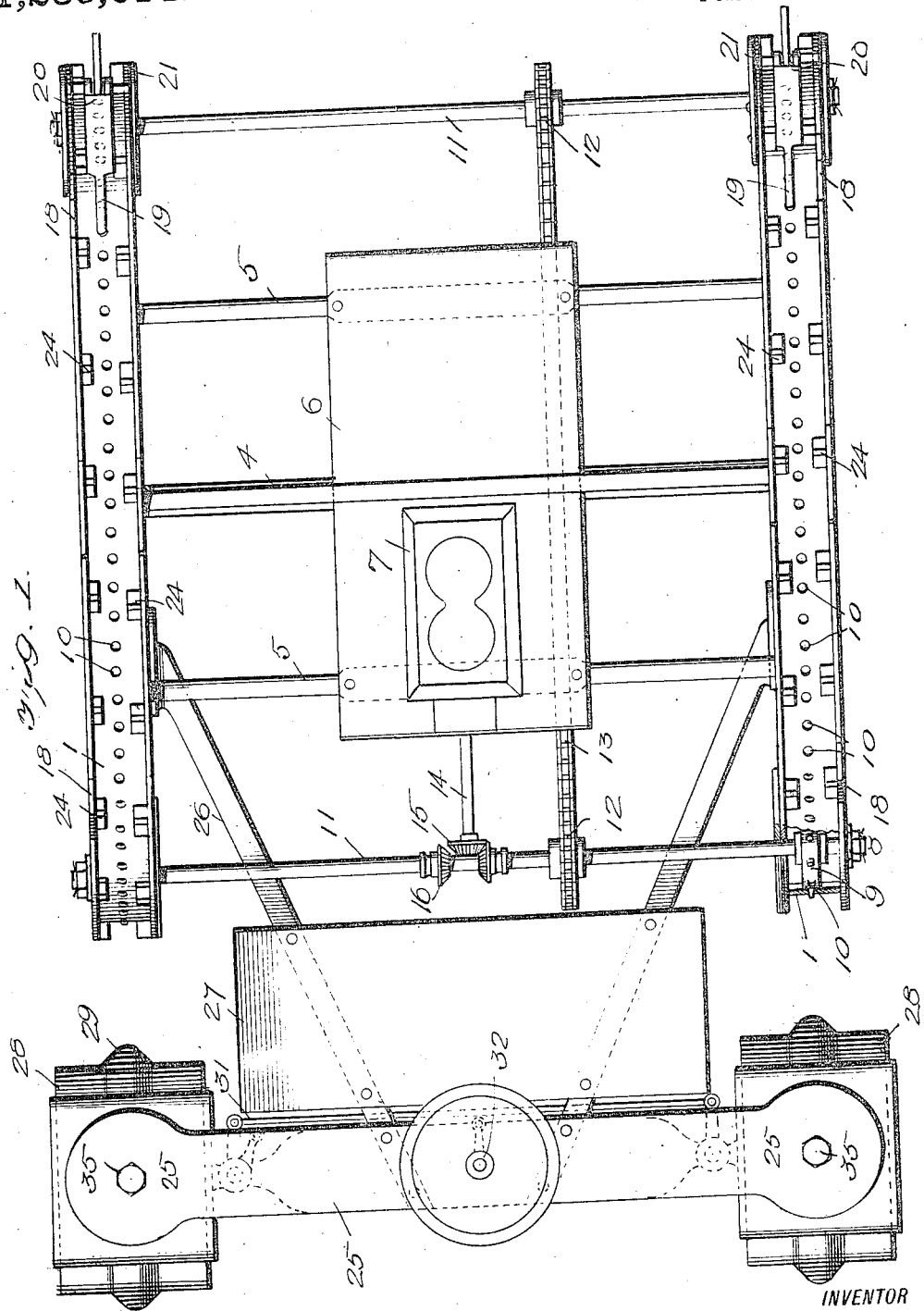
WITNESSES
F. E. Barry
C. E. ?
INVENTOR
Joseph Mosca
BY Munn & Co.
ATTORNEYS

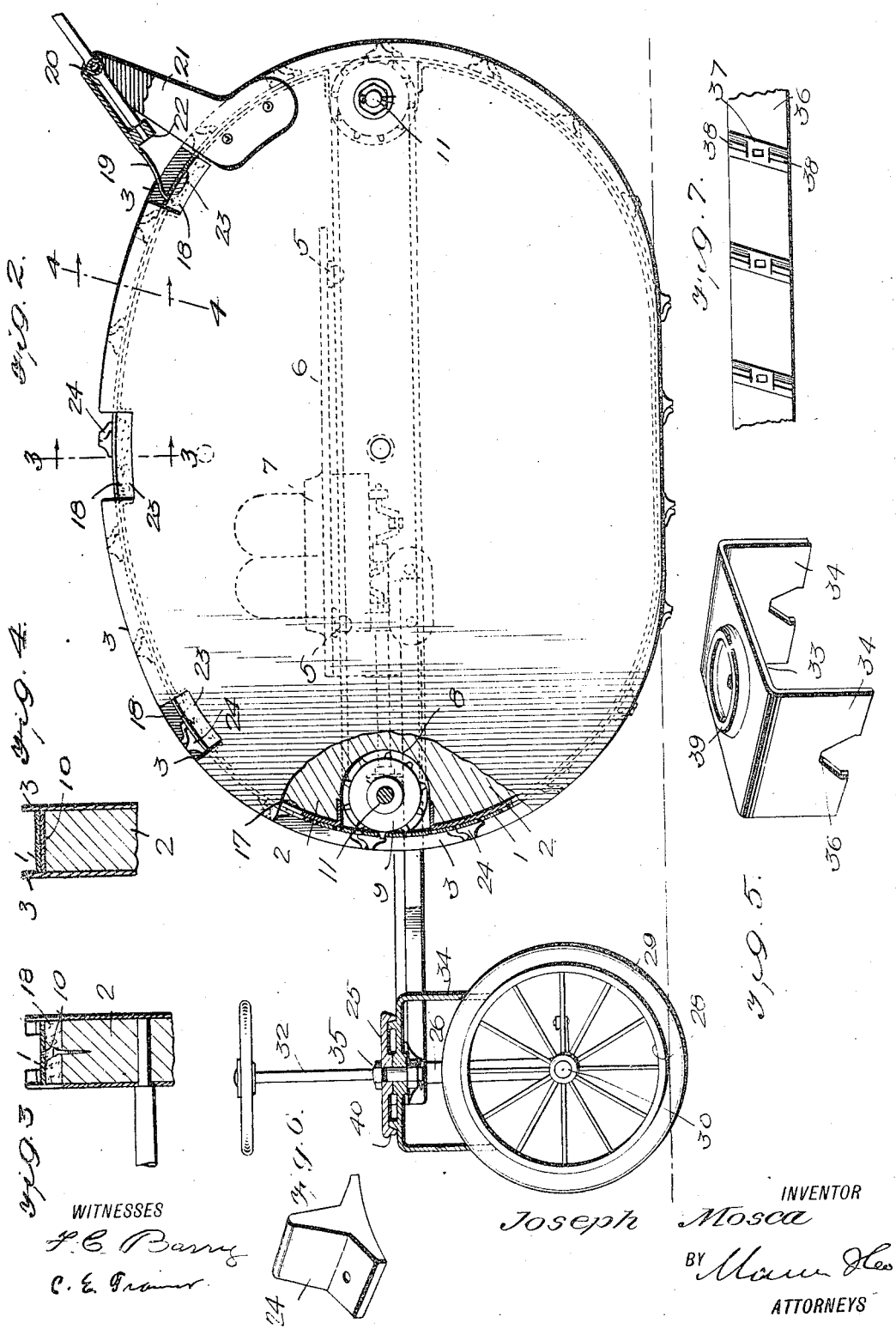

UNITED STATES PATENT OFFICE.

JOSEPH MOSCA, OF ROUSE, COLORADO.

TRACTOR.

1,230,014.　　　　　Specification of Letters Patent.　　Patented June 12, 1917.

Application filed September 22, 1916. Serial No. 121,615.

*To all whom it may concern:*

Be it known that I, JOSEPH MOSCA, a citizen of the United States, and a resident of Rouse, in the county of Huerfano and State of Colorado, have invented a certain new and useful Improvement in Tractors, of which the following is a specification.

My invention is an improvement in tractors, and has for its object to provide a mechanism of the character specified especially designed for use in soft roads, as for instance in snow or mud, wherein the tractor is driven by an endless belt traveling about a fixed element and engaging the ground on the under side of said element, and having means for preventing slipping of the belt, and wherein front wheels are provided for smoothing and compacting the roadway for the propelling means, and wherein cleaning means is provided for the belt and for the front wheels.

In the drawings:

Figure 1 is a top plan view of the improved tractor;

Fig. 2 is a central section;

Figs. 3 and 4 are sections on the lines 3—3 and 4—4 respectively of Fig. 2, each view looking in the direction of the arrows adjacent to the line;

Fig. 5 is a perspective view of one of the front wheel cleaners;

Fig. 6 is a similar view of one of the holding lugs, and

Fig. 7 is a top plan view of a modified form of tractor wheel.

In the present embodiment of the invention, the propelling means is in the form of endless bands 1, each of which is mounted upon an elliptical support 2 of wood or like material, the said support having marginal flanges 3 between which the endless band moves. These supports 2 are connected by cross bars 4 and 5 upon which is mounted a platform 6 supporting a motor 7 of any usual or desired construction. At the ends of their long axes the supports 2 have recesses 8 in which are arranged sprocket wheels 9, the said wheels having spurs or lugs for engaging openings 10 in the endless belts.

The sprocket wheels are mounted on shafts 11 which are arranged transversely between the supports, and the wheels at the corresponding ends of the supports are secured to the same shaft. Each of these shafts is provided with a sprocket wheel 12 intermediate its ends and these wheels are connected by a chain 13. The motor shaft 14 is provided with a bevel gear 15 which is arranged between a pair of similar gears 16 on the shaft 11, and each of these gears is feathered on the shaft in such manner that it may move toward or from the gear 15 to rotate the shafts 11 forwardly or rearwardly.

The periphery of each of the supports 2 is provided with a facing 17 of metal, and means is provided for lubricating the contacting faces of the metal and of the belt, the said lubricating mechanism consisting of absorbent pads 18 which are arranged within recesses beneath the endless belts and at the tops of the supports. These pads are held to the support in any suitable or desired manner, as by means of nails or tacks, as shown in Fig. 3.

Means are also provided for keeping the openings 10 free from mud, dirt, and the like, which might cake therein. The said mechanism consists of a counterbalanced finger 19 which is secured to a stub shaft 20 at its upper end, the said shaft being mounted between brackets 21 on the opposite sides of the support. This finger is of a size to enter the openings 10. The said openings are arranged in alinement and it will be evident that as the belt moves the finger will successively enter the openings. The finger is weighted by a counterweight 22 and it is so arranged that the endless belt will run beneath the finger which will enter each opening and will dislodge any matter that may be therein, and the said matter will fall into a recess 23 in the support.

Each of the bands 1 is provided with a series of cleats 24, the series being arranged at the opposite edges of the bands and the said cleats of one series are arranged slightly in advance of the corresponding cleats of the other series. The flanges 3 are cut away at the under sides of the supports, as shown in Fig. 2, to permit the cleats to be extended beyond the flanges in order that they may bite into the surface on which the tractor is moving.

A front truck is provided, consisting of a cross plate 25 which is connected to the respective supports by inclined reach bars 26. These reach bars are connected with one face of the supports at their rear ends and they extend inwardly and forwardly to a connection with the plate 25 near its center. A platform 27 is mounted on the reach bars just behind the plate 25 upon which the driver may stand.

A wheel 28 is arranged at each end of the support, each of said wheels having a broad tire as shown, and each tire is provided with a central rib 29. The wheels 28 are mounted directly in front of the supports 2, in such manner that each band 1 will run in the track of the adjacent wheel 28. The wheels are journaled upon spindles which are connected to the plate 25 as indicated at 26, and the spindles are connected by steering mechanism indicated at 31. A steering post 32 is journaled at the center of the plate 25 and this post is connected to the steering mechanism to simultaneously swing the wheels in the same direction. The wheel of the post is directly in front of the platform 27.

Means is also provided for cleaning the wheels 28, each of said means consisting of a substantially U-shaped member comprising a body 33 and depending arms 34 and the body is connected to the adjacent end of the plate 25, as indicated at 35. The arms and the bracket are notched or recessed as indicated at 36, to permit the passage of the rib 29 and the cleaners are so arranged that the lower edges of the arms 34 move in contact with the peripheral surfaces of the wheels 28. It will be evident that as the wheels rotate the peripheries thereof will be continuously cleaned by the cleaning means.

It will be noticed from an inspection of Figs. 2 and 5 that the body of each cleaner is provided on its upper surface with an annular rib 39 coaxial with the opening through which the bolt 35 that connects the cleaners to the plate 25 is passed. This rib 39 fits within a depending rib 40 on the plate, and the cleaners may thus rotate to follow the movement of the wheels 28. It will be noted from an inspection of Figs. 3 and 4 that the flanges 3 are formed in the present instance by plates of sheet metal which are arranged on opposite faces of the supports.

In Fig. 7 is shown a modified construction of belt wherein the belt 36 is provided with openings 37 for the lugs of the sprocket chain, and a series of cleats 38 is arranged at each side of the band. The holding portions of these cleats are inclined as shown, while the holding portions of the cleats 24 are perpendicular to the plane of the supports.

I claim:—

1. A tractor comprising a pair of elliptical supports, a rigid connection between said supports, an endless band on each support and having holding cleats on its outer face, each support having guide flanges for the band, said supports having their long axes horizontal, shafts arranged at the ends of the said long axes, said shafts having sprocket wheels and the supports having recesses for receiving the wheels, and the bands having openings for engagement by the spurs of the wheels to propel the bands, means for driving the shafts, a wheeled front truck for guiding the supports, means at each support for freeing the openings of the adjacent bands, and means for lubricating each band.

2. A tractor comprising a pair of elliptical supports, a rigid connection between said supports, an endless band on each support and having holding cleats on its outer face, each support having guide flanges for the band, said supports having their long axes horizontal, shafts arranged at the ends of the said long axes, said shafts having sprocket wheels and the supports having recesses for receiving the wheels, each band having openings for engagement by the spurs of the wheels to propel the band, means for driving the shafts, and a wheeled front truck for guiding the supports.

3. In a tractor, a propelling means comprising an endless band having outstanding cleats, a fixed support upon which the band is mounted, and means for moving the band circumferentially of the support, said support being substantially elliptical and arranged with its long axis horizontal, driving means comprising sprocket wheels at the ends of the long axis, the band having openings for engagement by the spurs of the wheels, and means for lubricating the band.

4. In a tractor, a pair of rigidly connected fixed supports, an endless band mounted to move circumferentially of each support, means for driving the band, means for lubricating the band, and a front truck having wheels at its ends mounted to swing together to guide the said truck, said truck being rigidly connected to the supports, each of said wheels having a central peripheral rib, and cleaning means at each wheel engaging the periphery thereof to clean the same.

5. In a tractor, a pair of rigidly connected fixed supports, an endless band mounted to move circumferentially of each support, means for driving the band, means for lubricating the band, and a front truck having wheels at its ends mounted to swing together to guide the said truck, said truck being rigidly connected to the supports.

6. In a tractor, a pair of rigidly connected fixed supports, an endless band mounted to move circumferentially of each support, means for driving the band, means for lubricating the band, and means for guiding the tractor.

7. In a tractor, a support having a rounded periphery, and an endless band mounted to move on the periphery, means for moving the band, said band having holding cleats, means on the support for guiding the band, and means for lubricating the band.

8. In a tractor, a support having a rounded periphery, and an endless band mounted to move on the periphery, means for moving the band, said band having holding cleats, means on the support for guiding the band, said band having openings, and the moving means comprising sprocket wheels engaging the openings, and means adjacent to the band for cleaning the openings.

JOSEPH MOSCA.

Witness:
C. VICTOR MAZZONE.

Copies of this patent may be obtained for five cents each, by addressing the "Commissioner of Patents, Washington, D. C."